United States Patent

[11] 3,607,524

[72] Inventor Roger J. Kuhns
Lincoln, Mass.
[21] Appl. No. 2,454
[22] Filed Jan. 13, 1970
[45] Patented Sept. 21, 1971
[73] Assignee Avant Incorporated
Lincoln, Mass.

[54] METHOD OF PRODUCING A LAMINATED IMPRINTED DATA-BEARING CARD WHICH METHOD ELIMINATES COLLATION ERRORS
6 Claims, 1 Drawing Fig.

[52] U.S. Cl. .......... 156/220, 95/1.1, 156/209
[51] Int. Cl. .......... B44b 5/00
[50] Field of Search .......... 95/1.1; 156/209, 58, 219, 220

[56] References Cited
UNITED STATES PATENTS

| | | | |
|---|---|---|---|
| 3,039,582 | 6/1962 | Simjian | 95/1.1 X |
| 3,100,431 | 9/1963 | Hayes et al. | 95/1.1 X |
| 3,334,539 | 9/1967 | Kleist et al. | 95/1.1 X |
| 3,345,924 | 10/1967 | Kitrosser | 95/1.1 |

*Primary Examiner*—Benjamin A. Borchelt
*Assistant Examiner*—G. E. Montone
*Attorney*—Robert L. Nathans

ABSTRACT: A novel method of producing a laminated data-bearing card which involves photographing a subject together with a keypunched record card relating to the subject upon positive diffusion transfer film. The card is photographed against a dark background so that dark marks are recorded upon the positive print which marks correspond to the punched holes. The positive print is thereafter laminated to a protective cover sheet and is scanned by a code reader which in turn drives a printer which automatically embosses indicia such as a social security number corresponding to the code upon the card.

PATENTED SEP 21 1971 3,607,524
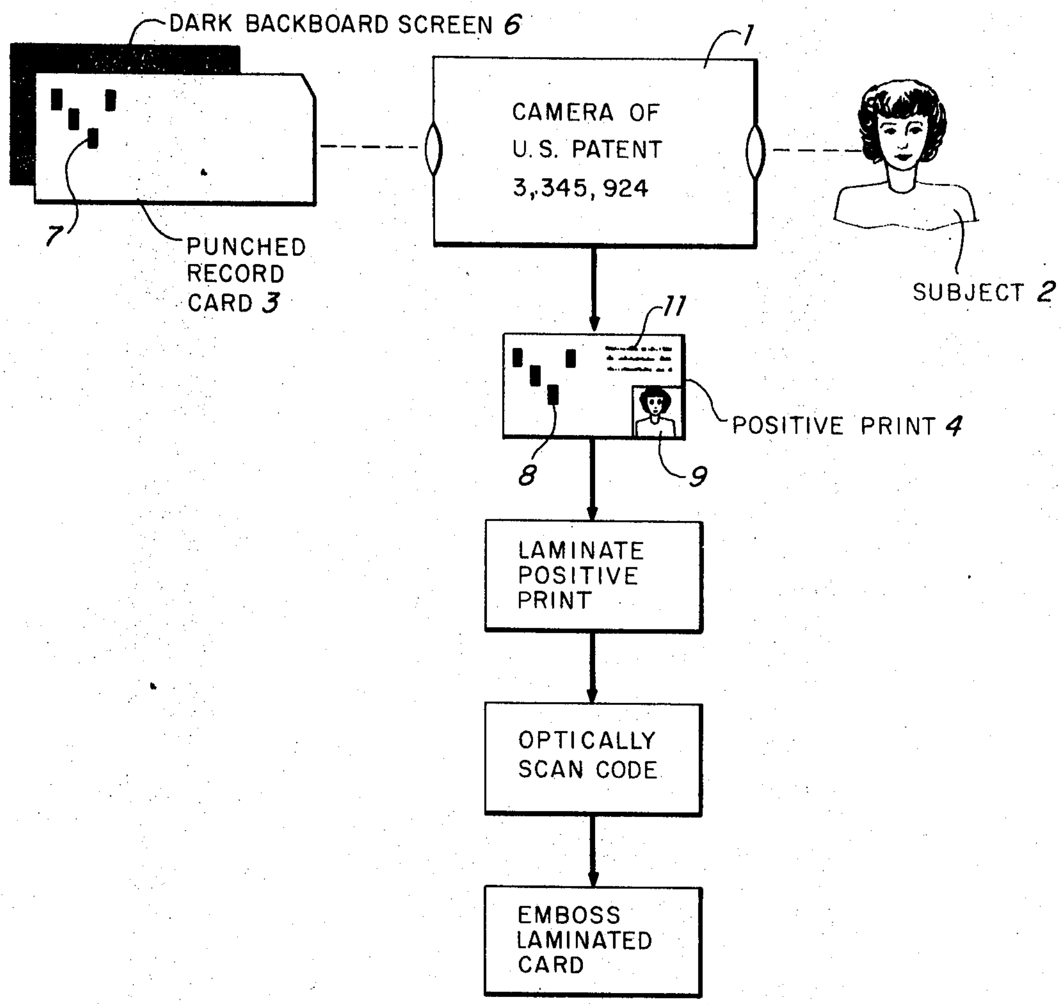
ROGER J. KUHNS
INVENTOR.
BY [signature]
ATTORNEY.

METHOD OF PRODUCING A LAMINATED IMPRINTED DATA-BEARING CARD WHICH METHOD ELIMINATES COLLATION ERRORS

BACKGROUND OF THE INVENTION

This invention relates to the field of laminating I.D. cards.

It is becoming more commonplace to produce laminated I.D. cards bearing a photograph of the subject in lawful possession of the card to prevent unauthorized use of the card. It is also desirable to emboss the subject's social security number upon the card for recordation purposes whereby ink is applied to the raised numerals embossed in the card and may be utilized to record a sales slip, for example, in the case of a credit card. It is current practice to sequentially emboss a large stack of laminated plastic cards, bearing the aforementioned photographs of the cardholders, with an embossing machine which embosses a social security number upon the cards and which is driven by electrical signals which are generally derived from the scanning of physically separate punched data cards, each of which is associated with a particular subject. Thus, a large stack of laminated cards bearing the photograph of the subjects and a large stack of punched data cards, one for each subject, are supplied to the automatic embossing system. It follows that each and every data card must be properly collated with each and every laminated card bearing the cardholder's photograph. Any erroneous collation will result in a card having a photograph of one subject and the social security number, or other data, of another subject embossed or imprinted thereon. Should a customer receive such an erroneously produced data card, he will be annoyed, will have to return the card, and might have to actually take the time to be rephotographed. Under these circumstances, the producer of the cards will have to throw out a large batch of the cards, since one collation error will result in the ruining of the entire batch. Besides being costly, fresh plastic chips will have to be utilized for the rerun which renders inventory control as set forth in detail in copending U.S. Pat. application Ser. No. 784,085, filed Dec. 16, 1968. As further explained in my copending patent application, inventory control to prevent pilfering and fraudulent preparation of the cards is based on controlling the number of transparent plastic chips which are issued to a given facility. In view of the above mentioned problems, it is desirable to provide a method of positive collation of punched data cards and laminated I.D. cards to be embossed bearing photographs or other unique data associated with cardholders.

SUMMARY OF THE INVENTION

In accordance with one embodiment of the present invention, a camera simultaneously photographs a given subject with a punched record unique to that subject. The positive print is thereafter laminated to form an I.D. card which is thereafter optically scanned to produce control signals corresponding to the machine code on the record card, which control signals are utilized to emboss the subject's social security number upon his laminated card.

Other objects and more detailed features of the present invention will become apparent upon perusal of the following detailed description taken in conjunction with the drawing having a sole FIGURE illustrating the preferred process.

DETAILED DESCRIPTION

Referring now to the sole FIGURE, a camera 1 having positive diffusion transfer Land film positioned in its focal plane simultaneously photographs an individual subject 2 and the coded portion of a punched record card 3 to produce a positive print 4. An example of the type of camera for performing this function is set forth in U.S. Pat. No. 3,345,924 assigned to the same assignee as the present invention. The punched record card 3 is preferably positioned in front of a dark background screen 6. The machine readable code is preferably keypunched by conventional methods so that the binary elements are represented by apertures 7. The punches record card 3 will generally be light so that the dark upon positive print 4 which will also bear a photograph 9 of the subject 2 together will other data 11 as desired. The positive print 4 is thereafter joined to at least one protective transparent plastic cover sheet. This is generally accomplished by lamination which involves the application of heat and pressure as is well understood by those skilled in the art. After lamination, the binary code, comprising the marks 8, is thereafter scanned photoelectrically by scanners which are well known to those skilled in the art. The resulting electrical signals are thereafter utilized to drive a print head which sequentially emboss the numerals represented by the binary code upon the laminated card. While the details of the scanner and electrically controlled embossing device form no part of the present invention, it may be stated in passing that generally what is provided is a feedback loop which causes a printing turret bearing various raised numerals to be sequentially stepped. A code comparator would compare a given code representative of a scanned numeral on the card with a code which is representative of the instantaneous position of the stepped turret. When the two codes addressing the comparator are equal, the proper numeral on the turret will be in the printing position and a print signal will be generated by the comparator to cause the laminated card to be pressed against the raised numeral thereby to emboss the numeral upon the laminated card. This process is repeated until all of the data is embossed upon the card.

It is to understood that the final data imprinted after lamination need not necessarily be numerical or, for that matter, need not be embossed. It is also conceivable that numerous variations in the machine-readable code may be utilized and the code need not necessarily be binary. Also the information recorded in the right-hand corner of positive print 4 need not necessarily be a photograph of a person or other subject but could be other indicia.

Obviously many modifications and variations of the present invention are possible in the light of the above teachings. It is therefore to be understood, that within the scope of the appended claims, the invention may be practiced otherwise than as specifically described.

While it is greatly preferred to perform the scanning step after the laminating step to ensure collation, it might conceivably be possible to laminate and scan the code simultaneously.

I claim:

1. A method of producing data-bearing card having a photograph of a particular subject thereon and having data representing specific information associated with said subject printed upon said card, comprising the steps of:

producing a record card having a machine-readable code thereon corresponding to said particular subject;

photographing upon a photosensitive sheet said subject and said machine-readable code associated with said record sheet;

joining said photosensitive sheet to said data card;

reading said machine readable code on said data card to produce imprint control signals; and utilizing the imprint signals produced by said reading step for imprinting said data representing said specific information associated with said subject upon said same data bearing card thereby to prevent costly collation errors.

2. The method as set forth in claim 1 wherein said reading step is performed after said joining step.

3. The method of claim 1 wherein said record sheet is punched pursuant to a binary code.

4. The method of claim 3 further including the step of photographing said record card against a dark background to produce dark marks upon said photosensitive sheet corresponding to punched holes in said record card representative of said machine-readable code.

5. The method of claim 1 wherein said imprinting step embosses the data associated with said subject upon said data-bearing card.

6. The method of claim 4 wherein said imprinting step embosses the data associated with said subject upon said data-bearing card.